United States Patent [19]

Boeckmann

[11] Patent Number: 5,067,302
[45] Date of Patent: Nov. 26, 1991

[54] SEALING JAWS FOR ZIPPERED FOIL OR FILM IN FORM, FILL AND SEAL MACHINES

[75] Inventor: Hugo Boeckmann, Arlington Heights, Ill.

[73] Assignee: Zip-Pak Incorporated, Northbrook, Ill.

[21] Appl. No.: 470,803

[22] Filed: Jan. 26, 1990

[51] Int. Cl.⁵ .............................. B65B 51/30
[52] U.S. Cl. ..................... 53/374.8; 53/552; 53/374.2
[58] Field of Search .................. 53/373, 552, 551

[56] References Cited

U.S. PATENT DOCUMENTS

| 2,837,883 | 6/1958 | Bracey | 53/552 |
| 4,079,570 | 3/1978 | Rucker | 53/373 X |
| 4,512,138 | 4/1985 | Greenawalt | 53/373 X |
| 4,551,965 | 11/1985 | Prottengeier | 53/373 X |
| 4,582,555 | 4/1986 | Bower | 53/373 X |
| 4,682,976 | 7/1987 | Martin et al. | 53/373 X |
| 4,727,709 | 3/1988 | Zieke et al. | 53/551 |
| 4,745,731 | 5/1988 | Talbott et al. | 53/451 |
| 4,768,326 | 9/1988 | Kovacs | 53/373 |
| 4,790,126 | 12/1988 | Boeckmann | 53/552 X |
| 4,807,426 | 2/1989 | Smith | 53/373 X |

FOREIGN PATENT DOCUMENTS

| 1187980 | 2/1965 | Fed. Rep. of Germany | 53/373 |
| 2551139 | 7/1976 | Fed. Rep. of Germany | 53/373 |
| 2059337 | 4/1981 | United Kingdom | 53/552 |

Primary Examiner—John Sipos
Attorney, Agent, or Firm—Hill, Van Santen, Steadman & Simpson

[57] ABSTRACT

Sealing jaw structure and method for securing zippered package making foil or film material, comprising sealing jaws, one of which carries a pair of spaced material engaging ribs for not only sealing but also tightening the material between the ribs during sealing cooperation of the jaws. The tightening facilitates cutting of the material being engaged between the jaws by a knife carried reciprocably by the jaw that carries the ribs.

4 Claims, 1 Drawing Sheet

U.S. Patent    Nov. 26, 1991    5,067,302
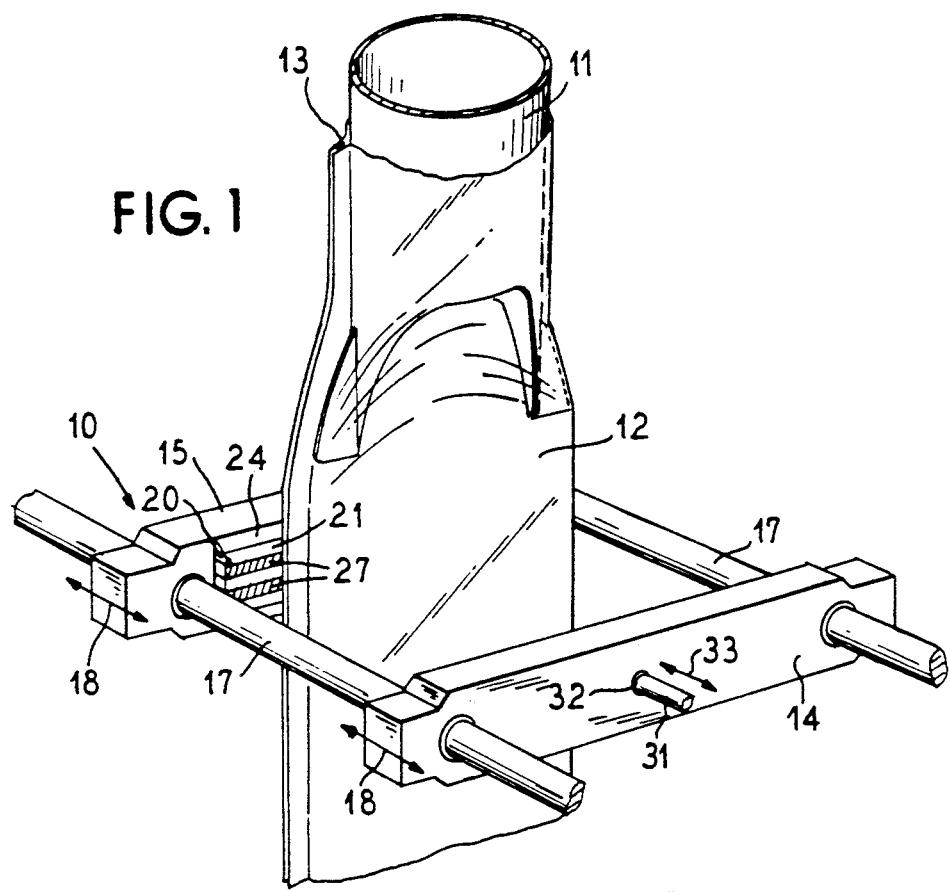
FIG. 1
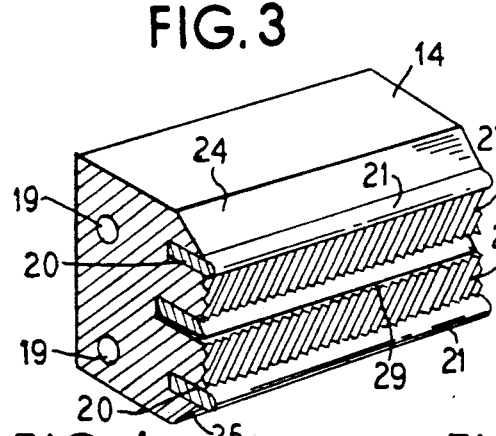
FIG. 3
FIG. 2
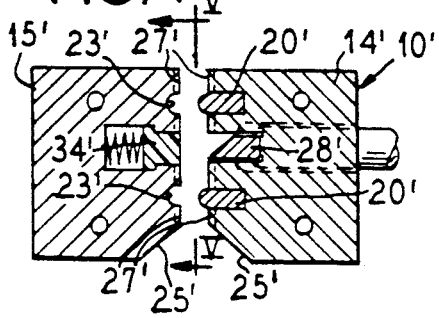
FIG. 4
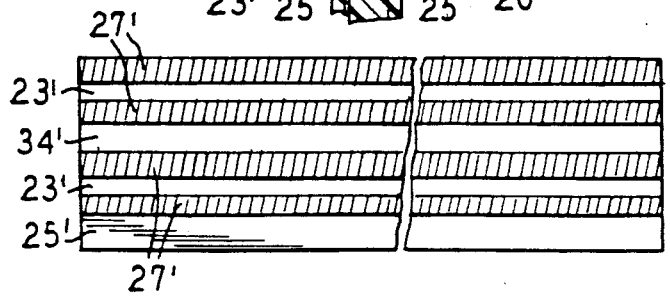
FIG. 5

SEALING JAWS FOR ZIPPERED FOIL OR FILM IN FORM, FILL AND SEAL MACHINES

BACKGROUND OF THE INVENTION

The present invention relates in general to the packaging art, and is more particularly concerned with improvements in the sealing and cutoff means in forms, fill and seal machines wherein packages are formed from zippered foil or film material.

Numerous and varied sealing and cutoff mechanisms for form fill and seal machines are known. By way of example, U.S. Pat. Nos. 4,727,709 and 4,745,731 are referred to and which disclose forms of sealing and cutoff mechanisms wherein separate sealing bars and separate cutoff means are provided. The disclosures of these patents are incorporated herein to any extent necessary for full understanding of the present invention in relation to details not disclosed herein because conventional.

One of the problems that has been prevalent in prior apparatus has been the difficulty in attainment of leak-proof securement of the extruded plastic zipper in the packages produced by the machines. An expedient that has been used heretofore is ultrasonic pre-welding of the zipper in order to avoid leakage at the opposite ends of the zipper in the packages.

Another problem has been the general complexity of the cut-off and sealing mechanisms, especially in form, fill and seal machines which use zippered foil or film.

SUMMARY OF THE PRESENT INVENTION

An important object of the present invention is to provide a new and improved sealing jaw means for package making machines, and especially useful with form, fill and seal machines.

Another object of the invention is to provide a new and improved sealing jaw and method for attaining leak-proof securement of the plastic zippers in packages produced from zippered foil or film.

A further object of the invention is to provide a new and improved combined sealing and cutoff jaw structure and method, especially, but not exclusively, useful for form, fill and seal packaging machines.

Pursuant to the present invention, there is provided a new and improved sealing jaw arrangement for securing zippered package making foil or film material and comprising a pair of cyclically cooperating sealing jaws for receiving the material therebetween, one of the jaws carrying a pair of spaced sealing ribs and a sealing surface between the ribs, and the other of the jaws having means cooperating with the sealing surface for sealing the material. One of the jaws desirably provides a mount for a cutoff knife, and the other of the jaws has means for receiving the knife in a package cutoff stroke substantially coincident with the sealing cycle of the sealing jaws.

There is also provided a method of end sealing and cutoff which may be practiced with the foregoing apparatus.

BRIEF DESCRIPTION OF THE DRAWINGS

Other objects, features and advantages of the invention will be readily apparent from the following description of the preferred embodiments thereof, taken in conjunction with the accompanying drawings, although variations and modifications may be effected without departing from the spirit and scope of the novel concepts of the disclosure, and in which:

FIG. 1 is a more or less schematic, fragmentary perspective view of sealing and cutoff mechanism embodying the present invention and showing the complementary sealing jaws thereof in the open or separated relation;

FIG. 2 is a fragmentary sectional detail view showing the jaws of FIG. 1 in the closed sealing and cutoff relation in the cycle of operation;

FIG. 3 is a fragmentary perspective view of the sealing face of one of the jaws;

FIG. 4 is a more or less schematic end elevational view of a slight modification of the sealing jaws; and FIG. 5 is a fragmental elevational view taken substantially along the line V—V in FIG. 4.

DETAILED DESCRIPTION

As shown in FIG. 1, an end sealing jaw mechanism 10 may be located at a desired distance below the discharge or nozzle end of a forming or filling tube 11 of a form, fill and seal machine for cyclically securing into successive bags or packages package-making foil or film material 12 which has been in known manner wrapped about and advanced along the tube 11. An extruded plastic, profiled reclosable zipper 13 on the material is shown closed for conversion of the material into packages to be filled and sealed.

According to the present invention, the jaw mechanism 10 comprises a pair of cyclically cooperating sealing jaws 14 and 15 desirably in the form of unitary bars for receiving the material 12 therebetween. Any preferred means may be employed for controlling and guiding the jaws 14 and 15 cyclically from the spaced apart relation shown in FIG. 1 into the cooperatively pressed together sealing relation shown in FIG. 2 and return, coordinated with the operating cycles of the associated machine. In this instance, the jaws 14 and 15 are shown as mounted on fixed guide rods 17 which bracket the package making material 12 in spaced relation. The sealing bars 14 and 15 are reciprocatable along the guide rods 17 by driving means schematically represented by arrows 18 and which may comprise any known mechanism for the purpose, such as linkages, mechanical or fluid actuated operators, and the like.

A principal function of the sealing bars 14 and 15 is to effect end sealing of the package making material 12 for, as is customary, closingly sealing the upper side of the lead package which has been filled, and simultaneously sealing the end of the material 12 for closing the lower side of the next succeeding package.

Each of the sealing bars 14 and 15 is equipped with means, such as heaters 19, by which the temperature of the sealing bars is maintained, during operation, at a heat which will effect sealing of the foil or film material 12 and the zipper 13 when the jaws 14 and 15 are brought into the sealing cooperation shown in FIG. 2 from the spaced apart condition shown in FIG. 1, in a cycle of operation of the jaws.

For effecting a solid, permanent sealing of the material 12, including the zipper 13, in each contiguous package side portion during a cyclical sealing stroke of the jaws 14 and 15, one of the jaws, herein the jaw 14, is provided with means including spaced parallel projecting sealing ribs 20, each of which preferably has a smoothly rounded crown sealing profile 21. Although the ribs 20 may be formed integrally in one piece with the block providing the jaw 14, for fabrication convenience the ribs 20 are formed as bars fixedly set into respectively complementary grooves 22 to a depth which will permit the rounded sealing crowns 21 of the ribs to project a desired distance from the associated sealing surface of the sealing bar 14.

For accommodating the sealing ribs 21, without unduly thinning the material 12 between the bars 14 and 15 at the ribs 20 beyond the thinning effected between the remaining sealing faces of the bars, the sealing bar 15 is provided with means cooperating with the ribs 20, herein comprising complementary groove depressions 23 of arcuate shape complementary to the rib crowns 21 and within which the ribs engage in the sealing stroke of the bars 14 and 15.

Desirably at each of the outer sides of the ribs 20 and the sealing grooves 23, the bars have chamfered lead-in surfaces 24 along their upper edges and corresponding chamfered lead-out surfaces 25 along their lower edges to avoid any hangup of the package making material 12.

Between the ribs 20, the opposed sealing faces of the bars 14 and 15 are provided with serration die surfaces 27 with the serrations running generally transversely for providing corresponding seals in the package edge portions sealingly engaged by the surfaces 27.

In addition to their sealing function, the ribs 20 and complementary grooves 23 serve in the sealing mode or relation of the jaws 14 and 15 to anchor the portion of the package material located between the cooperating ribs an grooves against displacement longitudinally of the material 12 during severance of the thus anchored portion of the material as by means of a cutoff knife 28. Conveniently, the knife 28 comprises a blade member having a sharp edge 29 and is of a length at least equal to the full width of the flattened package material 12 gripped between the sealing jaws 14 and 15. The blade member 28 is accommodated slidably in a groove 30 in the face of one of the jaw members, herein the number 14. The groove 30 is of sufficient depth to permit the knife member 28 to be reciprocated from a clearance position as shown in dash outline in FIG. 2, clear of the package making material when first gripped by the jaws 14 and 15, into the full line position wherein the material held taut between the ribs 20 is severed by the knife edge 29. For effecting such reciprocation out of and then returned to the groove 30, an actuator 31 is connected to the back of the blade member 28 and projects through a bore 32 which communicates from the back of the jaw member 14 with the groove 30 for working attachment to the blade member 28. Suitable power means such as fluid operated actuator, linkage or the like represented by the directional arrow 33 operates the actuator 31 in timed relation to the cyclical operation of the jaws 14 and 15.

To facilitate the cutoff procedure, the other of the jaws, namely the jaw 15 is provided with cushioning means comprising a bar-like anvil member 34 which is slidably accommodated in a complementary groove 35 in the jaw member 15 and is biased by means such as compression spring or springs 37 so as to be yieldable when engaged by the knife edge 29. To minimize wear on the knife edge 29, the anvil bar 34 is desirably formed from a suitable wear resistant plastic material such as rigid nylon, polytetrafluoroethylene, or the like.

To avoid escape of the anvil member 34 from the groove 35, the anvil member may be provided at its inner edge with retaining shoulders 38 engageable with complementary stop shoulders 39 on the jaw member 15 defined within an enlargement of the groove 35.

In the modification in FIGS. 4 and 5, the structure of the sealing jaw mechanism 10' is substantially the same as in the mechanism 10 accept for the sealing faces of jaw members 14' and 15' which have serration die surfaces 27' which extend to both sides of the ribs 20' and the complementary grooves 23', where that is a desired configuration. In this instance only the lower sides of the jaw members 14' and 15' are provided with chamfers 25', although if preferred the upper side may also be thus provided. The lower side has the chamfer 25' to avoid interference with the product loaded and thus substantially bulged lower, lead packages sealed and cutoff in the mechanism 10' wherein the package making material is, similarly as in the mechanism 10, sealed as described, and cutoff by means of the blade 28' cushioned against the spring loaded yieldable anvil 34' functioning the same as described in connection with the mechanism 10.

It will be understood that variations and modifications may be effected without departing from the spirit and scope of the novel concepts of the present invention.

I claim as my invention:

1. A sealing jaw structure for simultaneously sealing adjacent tubular bags sealing the trailing end of one bag and the leading end of another comprising in combination:
    first and second cooperating sealing jaws for receiving multilayered tubular thermoplastic bag material therebetween and being reciprocal to move together to a clamping sealing position and apart to a spread position;
    means for heating each of said jaws;
    a laterally extending heated upper and a laterally extended heated lower extruding rib projecting from a face of the first jaw a predetermined distance and located respectively at the upper and lower edges of the jaw to form lateral seals across the bag material;
    laterally extending upper and lower heated grooves in the second jaw corresponding in position with the ribs, each of said extruding ribs having a depth so that said ribs do not completely extend into said grooves when said jaws are in said clamping position, so that thermoplastic material is extruded into said grooves by the ribs;
    a knife member located between said ribs for cutting the material of the bags when the jaws are in said clamping position;
    said ribs and said grooves heated by said heating means for simultaneously anchoring said thermoplastic material during cutting by said knife member and for forming an extruded seal of the thermoplastic material extruded into the grooves by the ribs; and
    a heated sealing face in each jaw located on each side of the knife between the knife and the ribs with said faces forming respective further seal continuous with the respective extruded seals at the ends of the bags with the extruded seal formed by the ribs being inwardly from the seal formed by said face.

2. A sealing jaw structure for simultaneously sealing adjacent tubular bags sealing the trailing end of one bag and the leading end of another and constructed in accordance with claim 1:
    wherein said heated sealing faces have corrugations therein.

3. A sealing jaw structure for simultaneously sealing adjacent tubular bags sealing the trailing end of one bag and the leading end of another and constructed in accordance with claim 1:

wherein said heating means comprises heating elements embedded in the jaws and said sealing faces of said ribs and grooves are heated by the heating means.

4. A sealing jaw structure for simultaneously sealing adjacent tubular bags sealing the trailing end of one bag and the leading end of another and constructed in accordance with claim 1:

wherein said knife member is moveable in a direction toward the opposing jaw and the opposing jaw is provided with a spring supported anvil which recedes as the knife member moves toward the anvil.

* * * * *